(12) United States Patent
Tsai et al.

(10) Patent No.: US 8,754,609 B2
(45) Date of Patent: Jun. 17, 2014

(54) WIRELESS CHARGING COIL STRUCTURE IN ELECTRONIC DEVICES

(75) Inventors: Ming-Chiu Tsai, New Taipei (TW); Chi-Che Chan, New Taipei (TW)

(73) Assignee: Fu Da Tong Technology Co., Ltd., Zhonghe Dist., New Taipei (TW)

( * ) Notice: Subject to any disclaimer, the term of this patent is extended or adjusted under 35 U.S.C. 154(b) by 333 days.

(21) Appl. No.: 13/276,014

(22) Filed: Oct. 18, 2011

(65) Prior Publication Data
US 2012/0074899 A1 Mar. 29, 2012

(30) Foreign Application Priority Data
Aug. 4, 2011 (TW) .............................. 100127754 A

(51) Int. Cl.
*H02J 7/00* (2006.01)
(52) U.S. Cl.
USPC .......................................... 320/108; 320/115
(58) Field of Classification Search
USPC ........................................................ 320/108
See application file for complete search history.

(56) References Cited

U.S. PATENT DOCUMENTS

| | | | |
|---|---|---|---|
| 6,028,413 A * | 2/2000 | Brockmann | 320/108 |
| 7,271,569 B2 | 9/2007 | Oglesbee | |
| 7,323,964 B1 * | 1/2008 | Shyu et al. | 336/131 |
| 7,629,768 B2 | 12/2009 | Pinedjian | |
| 7,868,585 B2 | 1/2011 | Sarnowsky | |
| 8,288,894 B2 * | 10/2012 | Yoshimura | 307/104 |
| 8,344,688 B2 | 1/2013 | Yoda | |
| 8,436,576 B2 | 5/2013 | Toya | |
| 2011/0227529 A1 * | 9/2011 | Smith et al. | 320/108 |
| 2012/0098349 A1 * | 4/2012 | Kim et al. | 307/104 |
| 2012/0206090 A1 | 8/2012 | Hyun-Jun | |
| 2012/0266471 A1 * | 10/2012 | Chao | 33/478 |
| 2013/0093252 A1 * | 4/2013 | Norconk et al. | 307/104 |

* cited by examiner

*Primary Examiner* — Edward Tso
*Assistant Examiner* — Ramy Ramadan
(74) *Attorney, Agent, or Firm* — Winston Hsu; Scott Margo

(57) ABSTRACT

The present inventions relates a wireless charging coil structure in electronic devices, comprising a PS coil module capable of emitting electromagnetic wave energy and a PR coil module capable of receiving power energy by electromagnetic induction. Each of the PS and PR coil modules includes a bar-shaped magnetic conductor, on which an insulated wire is wound into a first coil that is extended along the magnetic conductor to a given length and wound reversely into a second coil, thus producing an induction coil comprising at least the first and second coils. The induction range with given space formed between the first and second coils is used for electromagnetic induction to transmit signals and power energy. Such structure can be applied not only in planar handheld electronic devices, but also in other wireless power transmission systems that require narrow induction surface for power transmission.

6 Claims, 8 Drawing Sheets

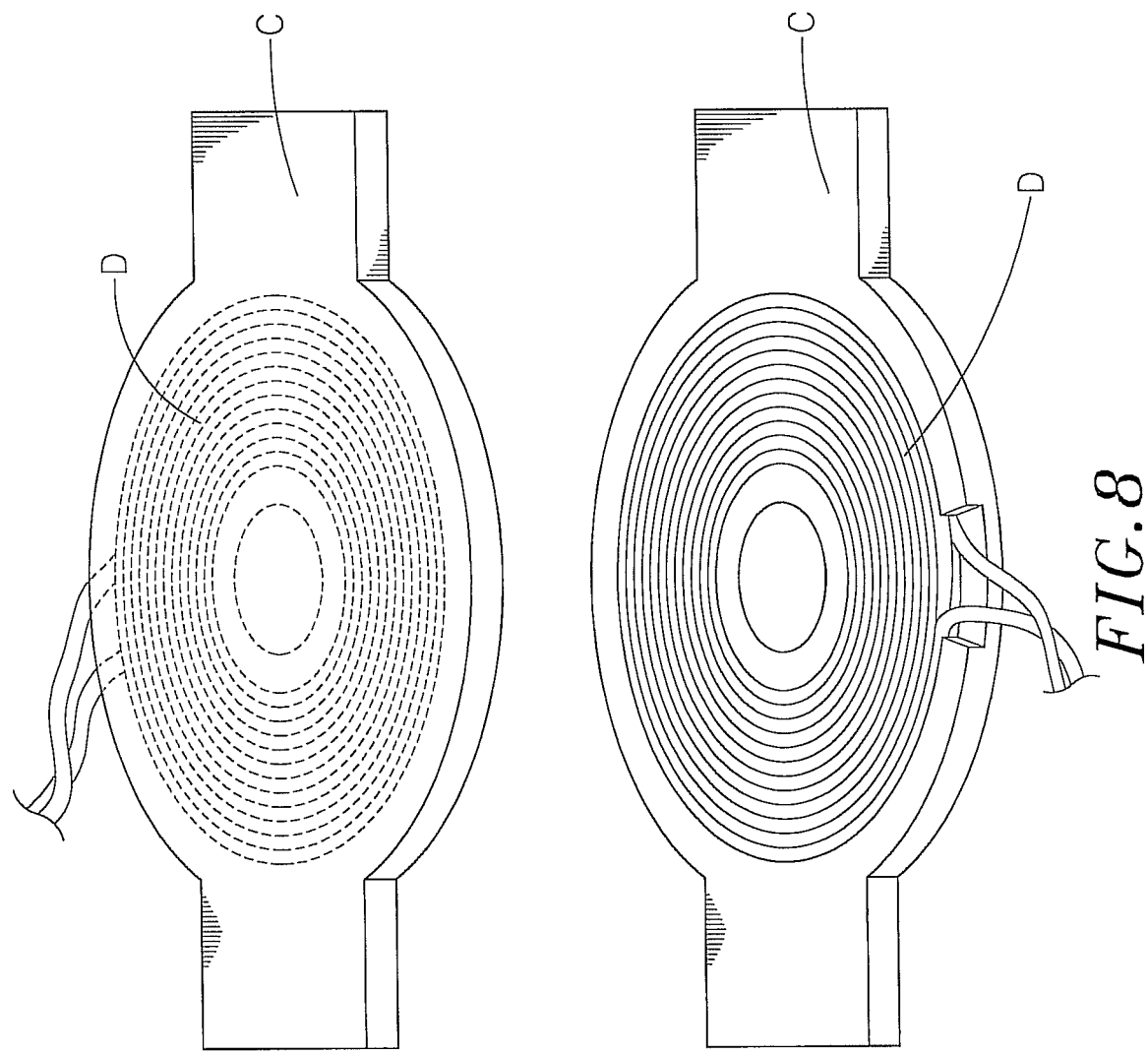

WIRELESS CHARGING COIL STRUCTURE IN ELECTRONIC DEVICES

This application claims the priority benefit of Taiwan patent application number 100127754 filed on Aug. 4, 2011.

BACKGROUND OF THE INVENTION

1. Field of the Invention

The present invention relates to a wireless charging coil structure in electronic products, particularly to a structure in which an insulated wire is wound on a magnetic conductor into a first coil, and the first coil is extended to a given length and then wound reversely into a second coil, so as to generate induced currents in the induction range between the first and second coils, making such structure applicable to transmission of power energy in devices with narrow inductive sections.

2. Description of the Related Art

Today, rapid developments in electronics and multimedia information result in the trend of lightness, thinness, shortness and miniaturization as well as multipurpose applications for handheld electronic devices, such as notebook and tablet computers, smart phones and personal digital assistants (PDA), making these devices be miniature in dimensions, lightweight and portable among other features. Besides, as software and hardware functions are developed one after another, the electronic devices can provide more practical applications and have been widely used as an essential part of our work, life and recreational activities.

Yet what is required in making handheld electronic devices portable, first of all, is the solution to power supply. The most common solution is to install rechargeable batteries in handheld electronic devices and provide a compatible power supply to recharge these batteries when electricity runs out. As handheld electronic devices are not manufactured according to the same specifications, however, different power supplies are needed to recharge these devices, and this may lead to significant increase in purchase costs. If there are many power supplies at hand, it will not only cause inconvenience in putting wires in order, but also require considerable space, in addition to inconveniences in placing or carrying them.

Thus, taking this problem into consideration, some firms have developed induction type power supplies, or known as wireless chargers, which are based on electromagnetic induction to transmit electric power and provide excellent convenience by supplying electric power by contactless electromagnetic induction. So these devices draw considerable attention upon launch in the marketplace. To put it simply, the method of supplying electric power by electromagnetic induction is to use two inductance coils for mutual induction of alternating current to transmit electric power on the principle similar to traditional wire-wound power transformers, followed by installation of induction coils in different electronic devices to support charging of these devices simultaneously, thus solving the problems of incompatibility of power supplies and inconvenience in carrying them effectively.

Induction type power supplies currently available in the market mostly rely on two coil modules as the power sourcing (PS) end to transmit electric power and power receiving (PR) end to receive electric power, and induction coils are required to be wound on magnetic materials of the coil modules, so that electric power can be transmitted through induction surfaces of the coil modules. Besides, the coil modules are designed to have considerable inductance and work with capacitors to generate resonance oscillations for wireless power transfer.

FIG. 7 shows a schematic drawing of an induction type power supply in conventional use. According to this figure, the induction type power supply originates and evolves from a power transformer at the early stage, in which separate toroid coils B are wound on central limbs of two E-shaped iron cores A, and air clearance of the iron cores is utilized for energy storage with low flux or leakage inductance. When applied in circuits of induction type power supplies, such design will cause too much loss of magnetic field induction in the process of coupling and thus reduce conversion efficiency. Though we may use larger E-shaped iron cores A to increase the effective sectional area, or increase the number of turns and enlarge air clearance to strengthen the ability of inducing electricity, it will result in overweight of E-shaped iron cores, making it inapplicable to handheld electronic devices that highlights portability.

Refer to FIG. 8, which shows a schematic drawing of another induction type power supply in conventional use. Such design prevails in wireless charging devices currently available in the market. According to this figure, the base plate C is wound by a hollow planar volute coil D used to transfer electric power inductively. Since wireless power energy is transmitted from both surfaces of the volute coil D at the PS end towards the volute coil D at the PR end, and cannot be fully received by the volute coil D at the PR end, the transmitted power energy may heat up surrounding devices or equipments and cause danger if absorbed by these devices or equipments. Therefore, for product design, the base plate C on which the volute coil D is wound must be made of magnetic materials capable of shielding electromagnetic waves.

Magnetic materials can reflect, absorb and transmit electromagnetic waves among other properties. To design a power supply with better power transmission efficiency, a common solution is to add magnetic materials with better reflection characteristics onto the uninduced surface of the volute coil D at the PS end as the base plate C and to add magnetic materials with better absorption characteristics onto the uninduced surface of the volute coil D at the PR end as the base plate C. Though such approach can derive better conversion efficiency, production costs cannot be reduced effectively due to difficulty in producing magnetic materials with reflection and absorption characteristics and considerably high prices of these materials. In addition, even though larger induction surface of the volute coil D wound onto the base plate C results in better capabilities to transfer and receive electric power by electromagnetic induction, since the volute coil D is shaped like a round, it is difficult to install the volute coil D in exquisite handheld electronic devices, thus making restrictions over integrated functions and effect of such power supply. As there is need to make further improvements in such regard, this is what those engaged in this field want urgently to research and improve.

SUMMARY OF THE INVENTION

In view of aforesaid problems and disadvantage of wireless charging devices, the inventor has collected related information, conducted assessments and taken considerations in many aspects, based on his experience of many years in this field and following continuous trials and corrections, has finally invented the wireless charging coil structure in electronic products in the present invention.

The primary object of the present invention is to make each of the PS and PR coil modules contain a bar-shaped magnetic conductor, on which an insulated wire is wound in the same direction into a first coil, and the first coil is extended along the magnetic conductor to a given length and then wound reversely into a second coil, so as to produce an induction coil consisting of at least the first and second coils. The induction range with given space formed between the first and second coils is used for electromagnetic induction to transmit signals and power energy. Such structure can be applied not only in planar handheld electronic devices, but also in other wireless power transmission systems that require narrow induction surface for power transmission.

The secondary purpose of the present invention is to enable the PS coil module or PR coil module to be switched through a circuit as a PR induction coil to receive electric power or as a PS induction coil to transmit electromagnetic wave energy, thus making the first electronic device be set into PS mode and transfer electric power to another electronic device set in PR mode, or making both sides, surfaces, bottom or side edges of the first electronic device lean against or stacked by at least another electronic devices. As the PS coil module or PR coil module is installed at the inner bottom or side edges of the electronic device, signals and power energy can be transmitted by electromagnetic induction for charging purpose, as long as many electronic devices lean against each other or overlap in close proximity on a plane.

A third object of the present invention is to ensure that the power energy transmitted by the induction coil of the PS and PR coil modules is transmitted only in the induction range between the first and second coils, thus making overall power transmission more stable. With high permeability properties of the magnetic conductor itself, this can effectively prevent electromagnetic emissions and avoid interference in normal operations of other electrical devices or equipments, and make it unnecessary to add shielding magnetic materials into non-induction range of the induction coil additionally for safety purpose.

Another object of the present invention is to wind in order of alternating winding directions the first and second coils which contains induction coils arranged in array, install the PS and PR coil modules at the inner bottom of side edges of the electronic device, and then utilize the induction range formed between the first coil and the second coil of the induction coil to induce electric currents. This allows the PS and PR coil modules to be used in planar electronic devices or other wireless power transmission systems that require narrow induction surface for power transmission, without thickening the electronic devices as a whole, thus meeting design requirements for lightness, thinness, shortness and miniaturization.

A further object of the present invention is to establish at least one containing groove respectively on the magnetic conductors of the PS and PR coil modules within the induction range of the induction coil, and fix magnets with different polarities into each containing groove, or directly fix magnets within the induction range on the magnetic conductor, so as to make the induction ranges align each other by taking advantage of magnetic pull of the magnets with different polarities on the magnetic conductors. Besides, as the induction ranges of the PS and PR coil modules at the PS and PR ends are close to each other, it will increase the intensity of electromagnetic induction for the PR coil module significantly and make the induced currents higher and more stable, thus raising conversion efficiency of the PR coil module and hence overall efficiency of power transmission.

BRIEF DESCRIPTION OF THE DRAWINGS

FIG. 8 is a schematic drawing of another induction type power supply in conventional use.

DETAILED DESCRIPTION OF THE PREFERRED EMBODIMENT

Figure 1:
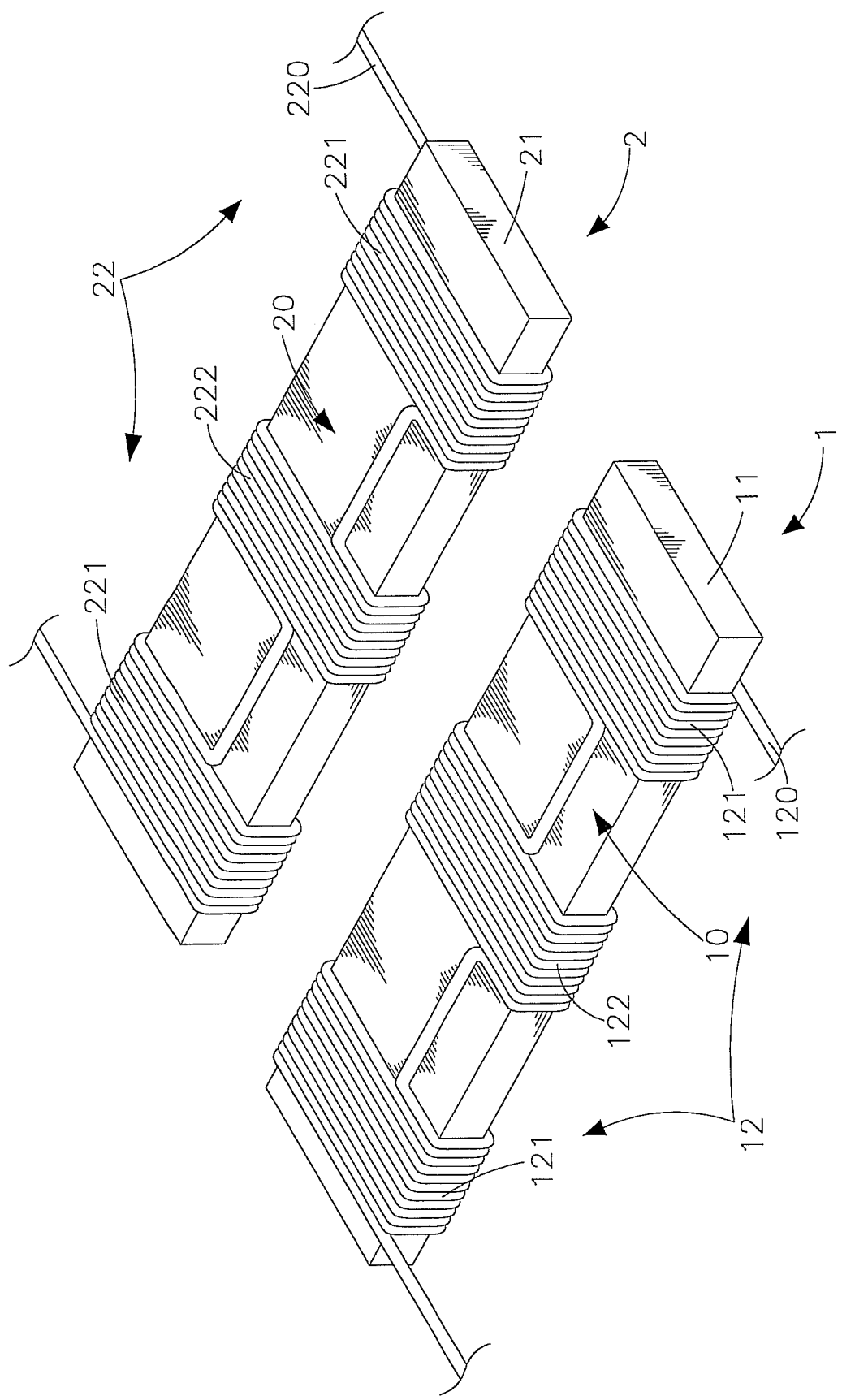
FIG. 1 is a three-dimensional appearance drawing of the present invention.
Figure 2:
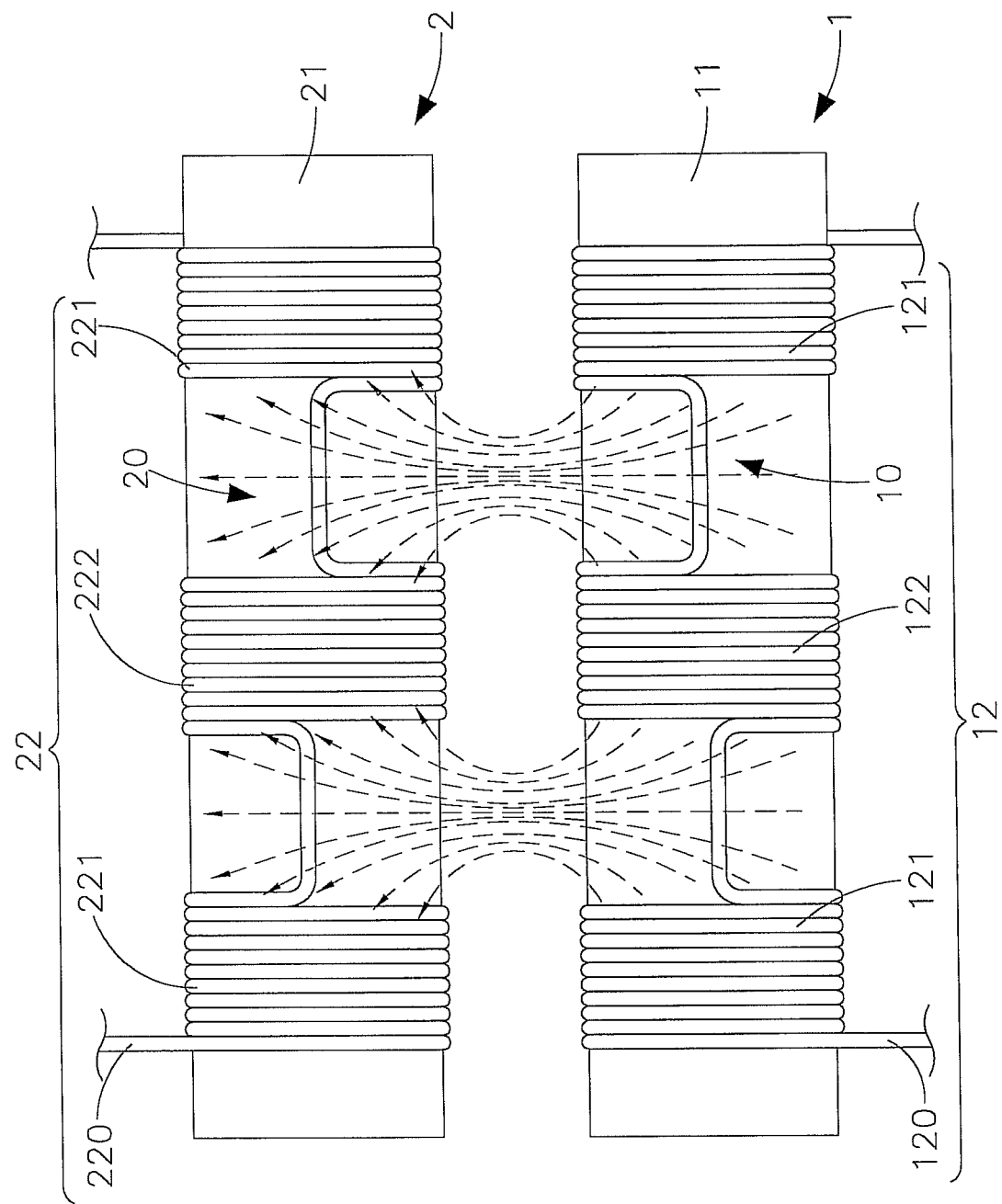
FIG. 2 is a schematic drawing of electromagnetic induction according to the present invention.
Figure 3:
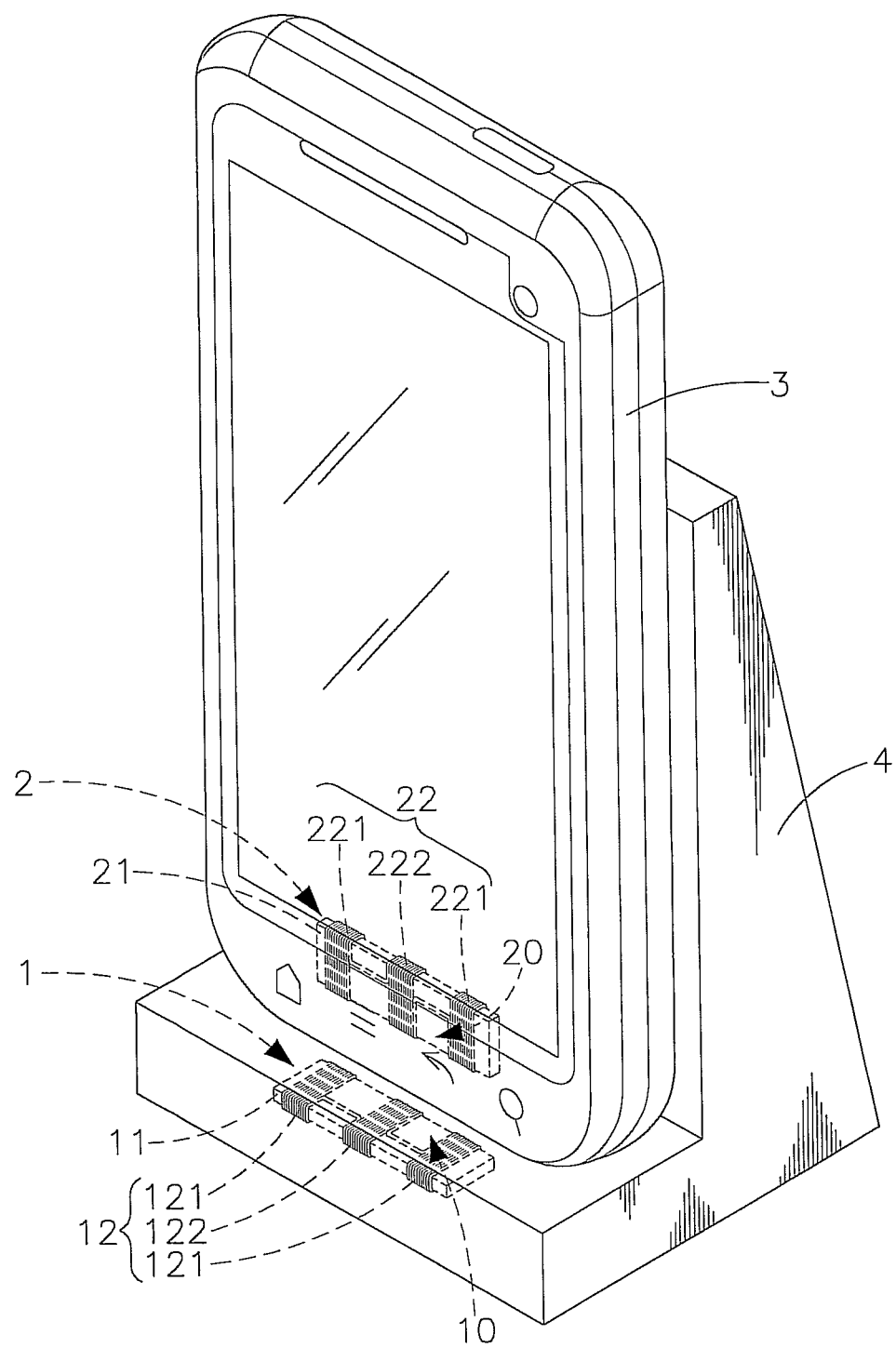
FIG. 3 is a three-dimensional appearance drawing according to one preferred embodiment of the present invention.
Figure 4:
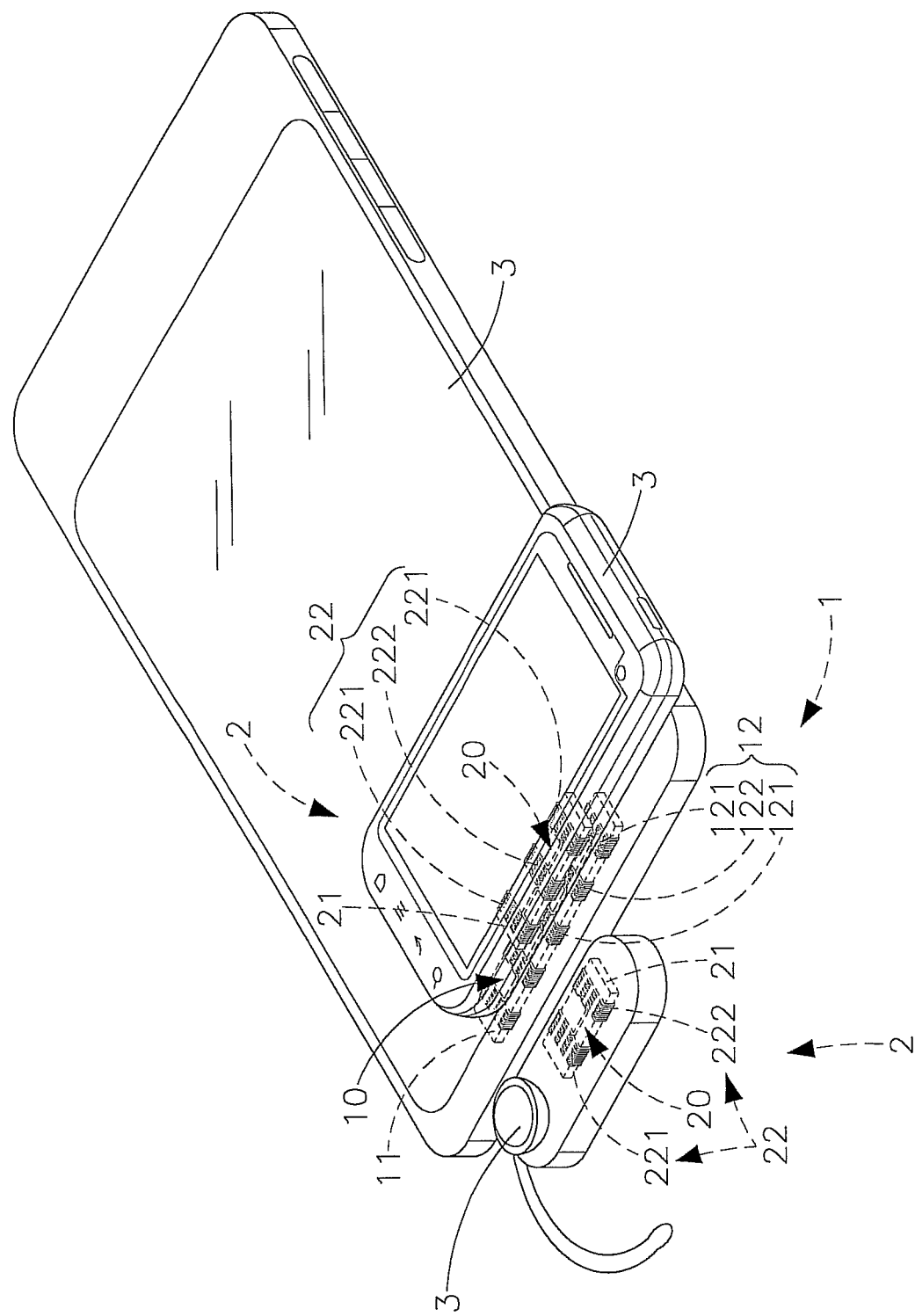
FIG. 4 is a three-dimensional appearance drawing according to another preferred embodiment of the present invention.

To achieve the aforesaid objects and functions as well as the techniques adopted in the present invention and its fabrication, examples of the preferred embodiments of the present invention are given below to illustrate features and functions of the present invention in detail by referring to the accompanying drawings.

Refer to FIGS. 1, 2, 3 and 4, which are respectively a three-dimensional appearance drawing and a schematic drawing of electromagnetic induction according to the present invention, and three-dimensional appearance drawings according to one and another preferred embodiment of the present invention. As shown clearly in these figures, the present invention comprises a power sourcing (PS) coil module 1 and a power receiving (PR) coil module 2 (their major components and features will be illustrated in following paragraphs), wherein;

The PS coil module 1 contains a magnetic conductor 11 in the shape of a long bar and an induction coil 12, and an insulated wire 120 is wound on a given number of turns in the same direction on the long side of the magnetic conductor 11 to form a first coil 121. The first coil 121 is extended and straightened along the magnetic conductor 11 to a given length, and then wound reversely on a given number of turns to form a second coil 122 and stretch out, forming an induction range 10 with given space between the first coil 121 and second coil 122, so as to wind the magnetic conductor 11 into the induction coil 12 consisting of at least the first coil 121 and second coil 122 that are wound in opposite winding directions and with given space.

The PR coil module 2 includes a magnetic conductor 21 in the shape of a long bar and an induction coil 22. On the long side of the magnetic conductor 11, an insulated wire 220 is wound from outside to inside on a given number of turns in the same direction to form a first coil 221. The first coil 221 is extended and straightened along the magnetic conductor 21 to a given length, and then wound reversely on a given number of turns to form a second coil 222 and stretch out, forming an induction range 20 with given space between the first coil 221 and second coil 222, so as to wind the magnetic conductor 21 into the induction coil 22 consisting of at least the first coil 221 and second coil 222 that are wound in opposite winding directions and with given space.

The aforesaid magnetic conductors 11 and induction coil 22 of the PS coil module 1 and PR coil module 2 may be magnetic materials with high permeability properties, e.g. iron powder cores, MPP cores, sendust cores, ferrite cores, high flux cores or other equivalent magnetic materials. Since these magnetic materials have been widely used in inductive components available in the marketplace, the production costs are relatively low. Besides, the cross sections of the magnetic conductors 11 and induction coil 22 may be designed to be a square, rectangle, polygon or in any other shape and fit in with the overall size of a handheld electronic device 3 or docking station 4, so that the simple PS coil module 1 and PR coil module 2 can be made by winding the induction coils 12 and 22 onto the magnetic conductors 11 and 21 and adjusting the coil diameter, turns and layers according to inductance required by wireless power transmission systems.

For use of the present invention, install the PS coil module 1 into computer peripherals, loudspeakers, high-speed fiber optical networks or docking stations 4 of other peripherals at first, and connect two ends of the induction coil 12 of the PS coil module 1 with a power driving circuit or control circuit. Then, install the PR coil module 2 into a handheld electronic device 3, and connect two ends of the induction coil 22 of the PR coil module 2 with a rectifying filter circuit or charging circuit. Thus, the handheld electronic device 3 (e.g. tablet computer, smart phone, PDA, etc) can be placed vertically in the docking station 4 at the PS end, allowing matching resonance of the power driving circuit or control circuit of the docking station 4 with the magnetic conductor 11 and induction coil 12 of the PS coil module 1 to produce oscillations and emit wireless charging electromagnetic wave energy to the handheld electronic device 3 at the PR end. At this moment, the magnetic conductor 21 of the PR coil module 2 is used in combination with the induction range 20 formed between the first coil 221 and the second coil 222 to receive electric energy by electromagnetic induction. After electric currents are induced from the electromagnetic field that varies periodically, the rectifying filter circuit or charging circuit is used to transmit signals to peripherals or conduct currents to charge the handheld electronic device 3, thus achieving the purpose of transmitting energy for wireless charging by electromagnetic induction. In this induction type power supply, the first coils 121 and 221 wound on the PS coil module 1 and PR coil modules 2 are supplemented by the second coils 122 and 222 with different winding direction and opposite polarities to ensure that electric power can only be transmitted within the induction ranges 10 and 20 formed between the first coils 121 and 221 and the second coils 122 and 222 in the PS coil module 1 and PR coil module 2, so as to ensure that power transmission is more stable on the whole. Besides, as the magnetic conductors 11 and 21 have properties of high permeability themselves, this can effectively prevent electromagnetic emissions and avoid interference in normal operations of other electrical devices or equipments, and make it unnecessary to add magnetic materials with better electromagnetic absorption or shielding properties into non-induction range of the induction coils 12 and 22 additionally for safety purpose.

However, the PS coil module 1 or PR coil module 2 in the handheld electronic device 3 can be switched through circuits as the PR induction coil 22 to receive electric power, or as the PS induction coil 12 to emit electromagnetic wave energy according to different needs or designs. Therefore, the first handheld electronic device 3 (such as tablet PC) at the PS end can be set into power supply mode to transmit electric power to another handheld electronic device 3 (e.g. smart phone) that is set into power receiving mode at the PR end. In practical applications, however, the left and right sides, surfaces, bottom or side edges of the first handheld electronic device 3 (such as tablet PC) may be leaned or stacked by at least two second handheld electronic devices 3 (such as smart phones, Bluetooth earphones). As the PS coil module 1 or PR coil module 2 is installed at the inner bottom or side edges of the handheld electronic device 3, such fabrication allows the PS coil module 1 and PR coil module 2 to be applied not only in planar handheld electronic devices 3, but also in devices of other wireless power transmission systems that require narrow induction surfaces to transmit power energy. Therefore, at time of charging, signals and power energy can be transmitted by electromagnetic induction for charging purpose, as long as many handheld electronic devices 3 approach each other or overlap in close proximity on a plane.

Figure 5:
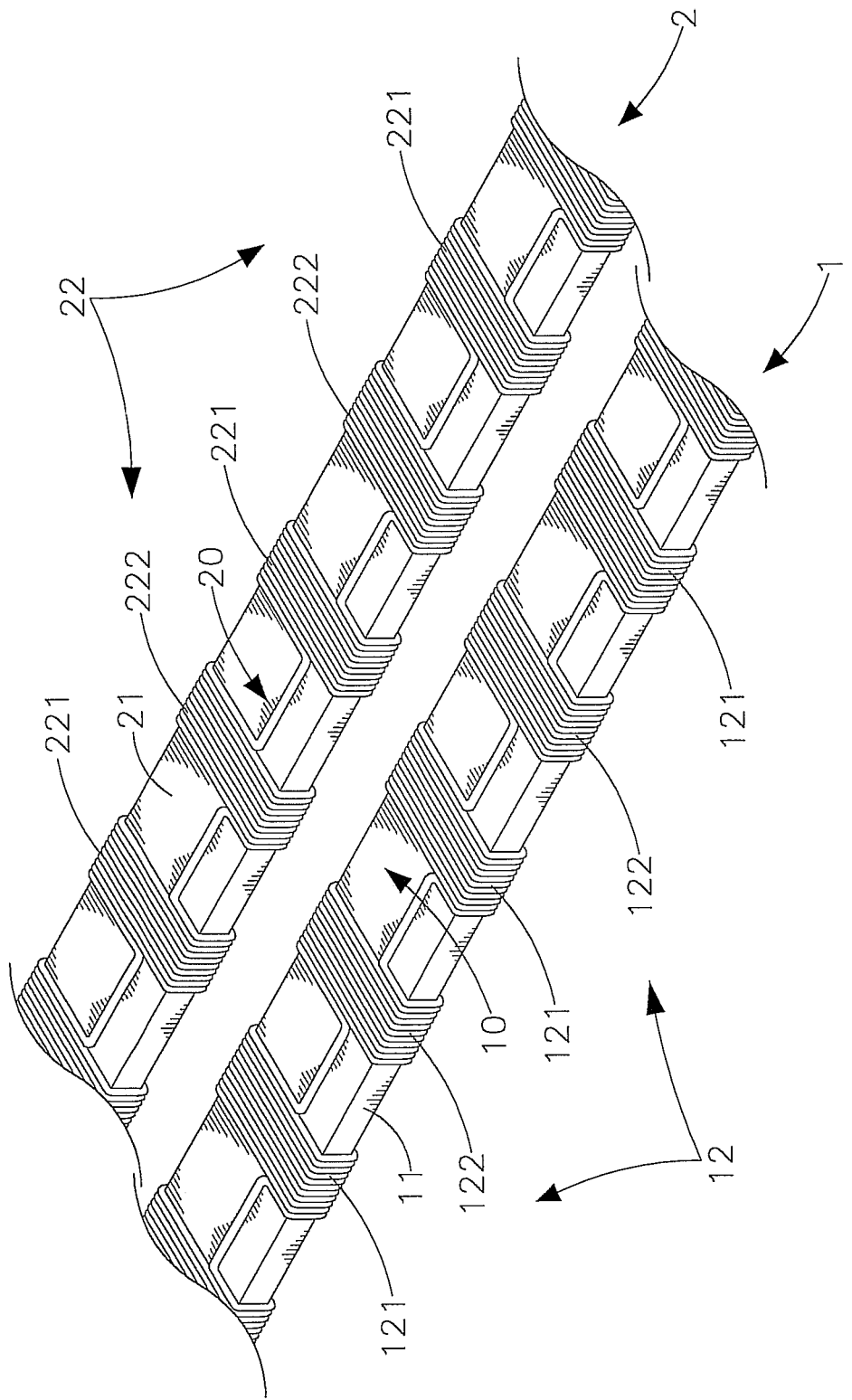
FIG. 5 is a three-dimensional appearance drawing according to a further preferred embodiment of the present invention.
Figure 6:
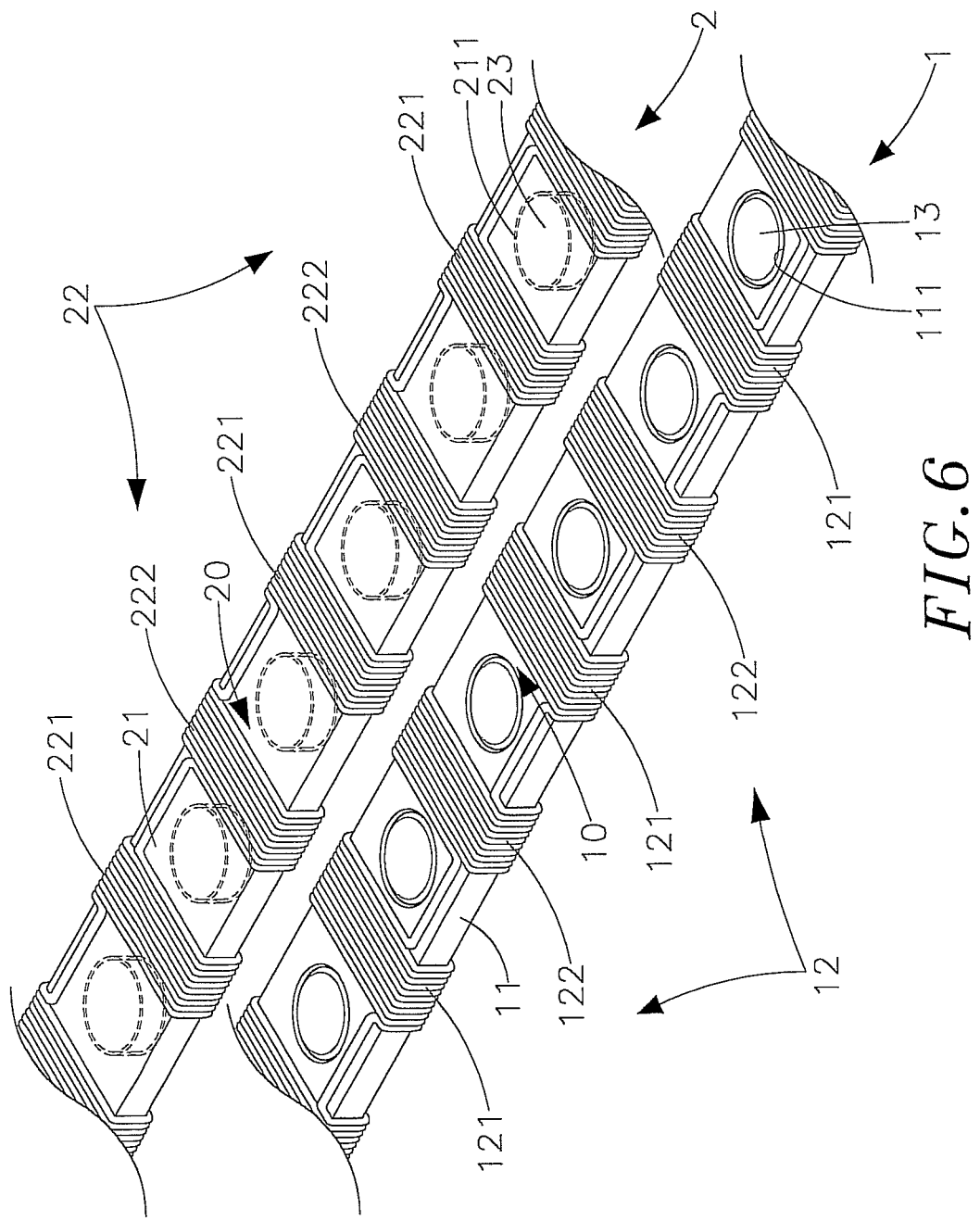
FIG. 6 is a three-dimensional decomposition drawing according to another preferred embodiment of the present invention.
Figure 7:
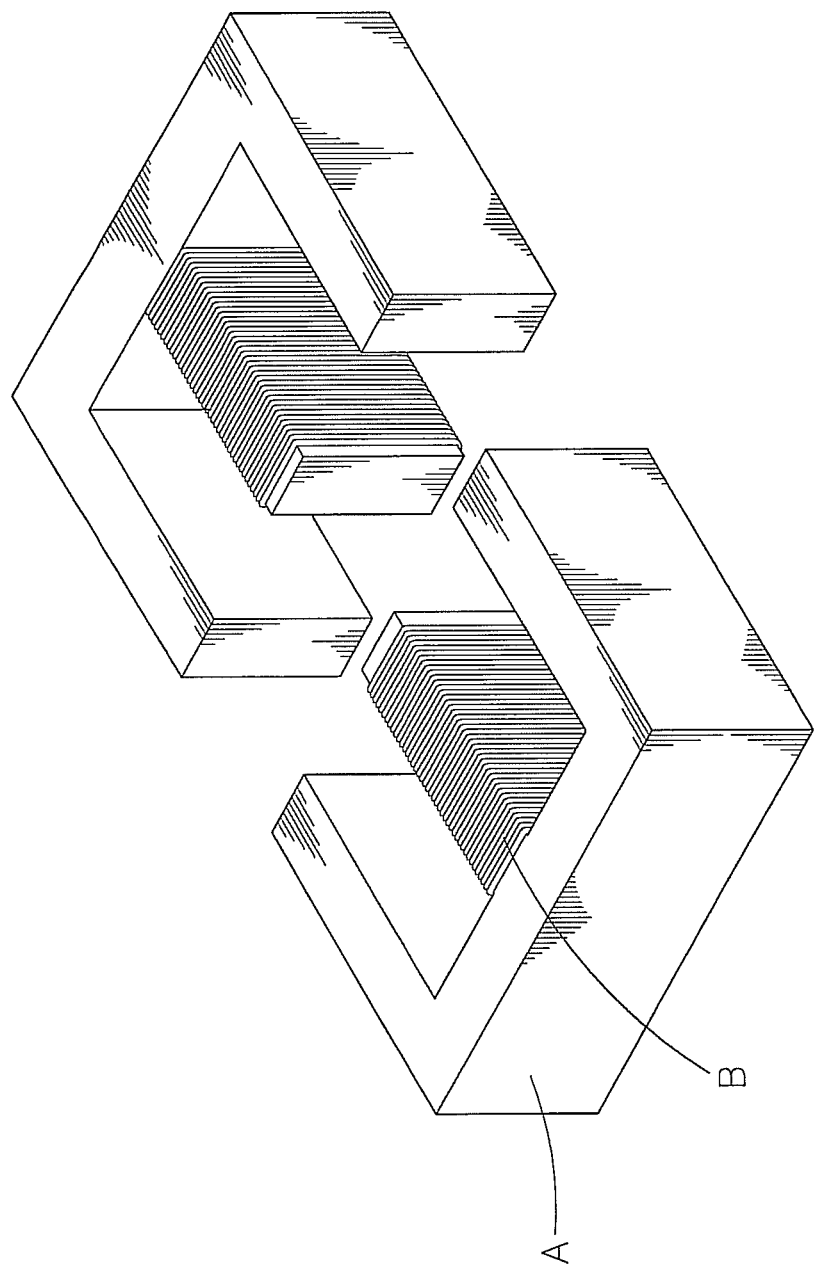
FIG. 7 is a schematic drawing of an induction type power supply in conventional use.

Refer to FIGS. 5 and 6 that show a three-dimensional appearance drawing in accordance with a further preferred embodiment of the present invention and a three-dimensional decomposition drawing according to another preferred embodiment of the present invention. As shown clearly in these figures, the magnetic conductors 11 and 21 of the PS coil module 1 and PR coil module 2 may be in the shape of a long bar, where the first coils 121 and 221 as well as the second coils 122 and 222 are wound in order on a given number of turns in opposite winding directions and arranged in array. Such winding method may be changed, and the PS coil module 1 and PR coil module 2 is installed at the inner bottom of side edges of the handheld electronic devices 3, then electric currents is induced in the induction ranges 10 and 20 formed between the first coils 121 and 221 and the second coils 122 and 222 of the induction coils 12 and 22. This method allows the PS coil module 1 and PR coil module 2 be used in planar handheld electronic devices 3 or other wireless power transmission systems that require narrow induction surface for power transmission, without thickening the handheld electronic devices 3 as a whole, thus meeting design requirements for lightness, thinness, shortness and miniaturization.

Moreover, on the magnetic conductors 11 and 21 of the PS coil module 1 and PR coil module 2, at least one containing groove 111 and 211 can be further established within the induction ranges 10 and 20 of the induction coils 12 and 22 respectively, and magnets 13 and 23 with different polarities are fixed into the containing grooves 111 and 211 respectively, or at least one magnet 13 and 23 with different polarities is directly fixed within the induction range 10 and 20 on the magnetic conductors 11 and 21 respectively, so as to make the induction ranges 10 and 20 align each other by taking advantage of magnetic pull of the magnets 13 and 23 with different polarities on the magnetic conductors 11 and 21. Besides, as the induction ranges 10 and 20 of the PS coil module 1 and PR coil module 2 at the PS and PR ends are close to each other, it will increase the intensity of electromagnetic induction for the PR coil module 2 significantly and make the induced currents higher and more stable, thus raising conversion efficiency of the PR coil module 2 and hence overall efficiency of power transmission.

The aforesaid descriptions are given only to illustrate one preferred embodiment of the present invention and shall not be construed as limiting the appended patent claims of the present invention. It is hereby stated that all modifications and equivalent structural changes made without departing from the art and spirit of the present invention shall be included in the appended patent claims of the present invention.

In summary, the wireless charging coil structure in electronic products as disclosed in the present invention can achieve its functions and objects when applied practically. Therefore, the present invention is really an excellent one with practical applicability and can satisfy the terms and conditions for patentability of a utility model. While the application of patent is filed pursuant to applicable laws, your early approval will be highly appreciated so as to guarantee benefits and rights of the inventor who has worked hard at this invention. For any question, please do not hesitate to inform the inventor by mail, and the inventor will try his best to cooperate with you.

What the invention claimed is:

1. A wireless charging coil structure in electronic products, comprising:

a power sourcing (PS) coil module, capable of emitting electromagnetic wave energy and comprising a first bar-shaped magnetic conductor, wherein a first insulated wire is used to be wound around the first bar-shaped magnetic conductor in the same direction into a first power coil and extended along the first bar-shaped magnetic conductor to a first given length and wound reversely into a second power coil, making the first and second power coils form a first induction range of a first given space, thus establishing a first induction coil comprising the first power coil and the second power coil wound in different directions and separated by the first given space; and a power receiving (PR) coil module, capable of receiving power energy by electromagnetic induction, and comprising a second bar-shaped magnetic conductor, wherein a second insulated wire is used to be wound around the second bar-shaped magnetic conductor in the same direction into a first receiving coil and extended along the second bar-shaped magnetic conductor to a second given length and wound reversely into a second receiving coil, making the first and second receiving coils form a second induction range of a second given space, thus establishing a second induction coil comprising the first receiving coil and the second receiving coil wound in different directions and separated by the second given space, wherein the first and second receiving coils are respectively disposed corresponding to the first and second power coils.

2. The wireless charging coil structure in electronic products according to claim 1, wherein a cross section of the first bar-shaped magnetic conductor of the PS coil module or a cross section of the second bar-shaped magnetic conductor of the PR coil module is shaped like any of a square, rectangle and polygon.

3. The wireless charging coil structure in electronic products according to claim 1, wherein the first bar-shaped magnetic conductor of the PS coil module and the second bar-shaped magnetic conductor of the PR coil module are respectively selected from magnetic materials with high permeability properties.

4. The wireless charging coil structure in electronic products according to claim 1, wherein the first bar-shaped magnetic conductor of the PS coil module and the second bar-shaped magnetic conductor of the PR coil module are respectively selected from iron powder cores, MPP cores, sendust cores, ferrite cores and high flux cores.

5. The wireless charging coil structure in electronic products according to claim 1, wherein at least one magnet is fixed within the first induction range of the first induction coil on the first bar-shaped magnetic conductor of the PS coil module and the second induction range of the second induction coil on the second bar-shaped magnetic conductor of the PR coil module respectively, so as to make the first induction range and the second induction range align each other by making use of magnetic pull of the magnets with different polarities on the first bar-shaped magnetic conductor and the second bar-shaped magnetic conductor.

6. The wireless charging coil structure in electronic products according to claim 1, wherein at least one containing groove is established within the first induction range of the first induction coil on the first bar-shaped magnetic conductor of the PS coil module and the second induction range of the second induction coil on the second bar-shaped magnetic conductor of the PR coil module respectively, and magnets are fixed in the containing grooves, so as to make the first induction range and the second induction range align each other by making use of magnetic pull of the magnets with different polarities on the first bar-shaped magnetic conductor and the second bar-shaped magnetic conductor.

* * * * *